United States Patent
Janardhanan et al.

(10) Patent No.: US 9,237,066 B2
(45) Date of Patent: Jan. 12, 2016

(54) PACKET SWITCH MODULES FOR COMPUTER NETWORKS WITH EFFICIENT MANAGEMENT OF DATABASES USED IN FORWARDING OF NETWORK TRAFFIC

(71) Applicants: Pathangi Narasimhan Janardhanan, Chennai (IN); Balaji Venkat Venkataswami, Chennai (IN)

(72) Inventors: Pathangi Narasimhan Janardhanan, Chennai (IN); Balaji Venkat Venkataswami, Chennai (IN)

(73) Assignee: Dell Products, L.P., Round Rock, TX (US)

( * ) Notice: Subject to any disclaimer, the term of this patent is extended or adjusted under 35 U.S.C. 154(b) by 268 days.

(21) Appl. No.: 13/679,427

(22) Filed: Nov. 16, 2012

(65) Prior Publication Data
US 2014/0140220 A1    May 22, 2014

(51) Int. Cl.
    *H04L 12/24*    (2006.01)
    *H04L 12/56*    (2006.01)

(52) U.S. Cl.
    CPC ........ *H04L 41/0668* (2013.01); *H04L 41/0659* (2013.01); *H04L 41/082* (2013.01); *H04L 41/0813* (2013.01); *H04L 41/0846* (2013.01); *H04L 41/0859* (2013.01); *H04L 41/0873* (2013.01)

(58) Field of Classification Search
    CPC ............ H04L 41/0659; H04L 41/0668; H04L 41/0695; H04L 41/08; H04L 41/0681; H04L 41/0803; H04L 41/0816; H04L 41/082; H04L 43/50; H04L 43/00; H04L 1/00; H04J 3/14; H04B 10/0771
    See application file for complete search history.

(56) References Cited

U.S. PATENT DOCUMENTS

| 6,735,198 | B1 | 5/2004 | Edsall et al. |
| 7,590,760 | B1* | 9/2009 | Banks ................ G06F 11/2028 709/223 |
| 7,974,315 | B2 | 7/2011 | Yan et al. |
| 8,797,844 | B1* | 8/2014 | Strahle ................ H04L 45/28 370/219 |
| 8,811,158 | B1* | 8/2014 | Addepalli ............ H04L 45/28 370/225 |
| 2004/0090913 | A1* | 5/2004 | Scudder et al. ......... H04L 45/02 370/219 |

(Continued)

FOREIGN PATENT DOCUMENTS

| WO | WO 2006/014710 A2 | 2/2006 |
| WO | WO 2012/087934 A1 | 6/2012 |

OTHER PUBLICATIONS

Achieving Sub-Second IGP Convergence in Large IP Netowrks, Pierre Francois et al., Copyright 2009, Cisco Systems, 11 pages.

(Continued)

*Primary Examiner* — Candal Elpenord
(74) *Attorney, Agent, or Firm* — Haynes and Boone, LLP

(57) ABSTRACT

In a packet switch with databases (250, 404) used for packet forwarding, the database pieces are identified by version identifiers (410V) which are used by the packet switch's modules (LCx, RPM0, RPM1) in exchanging information on the databases and requesting updates to the databases. For example, if a primary management module fails and the management is transferred to a secondary management module, the secondary management module requests forwarding modules (e.g. line cards) to identify the database pieces stored on the forwarding modules, and to update the databases as needed. Use of version identifiers reduces the amount of data that has to be transferred in connection with such requests.

20 Claims, 4 Drawing Sheets

(56) References Cited

U.S. PATENT DOCUMENTS

| | | | |
|---|---|---|---|
| 2005/0050136 A1* | 3/2005 | Golla | H04L 45/05 709/200 |
| 2005/0135233 A1* | 6/2005 | May | H04L 45/00 370/216 |
| 2006/0092975 A1 | 5/2006 | Ansari et al. | |
| 2011/0075680 A1* | 3/2011 | Sun | H04L 45/00 370/419 |
| 2011/0235503 A1* | 9/2011 | Chen | H04L 41/0846 370/219 |
| 2011/0320861 A1 | 12/2011 | Bayer et al. | |
| 2012/0039335 A1 | 2/2012 | Subramanian et al. | |
| 2014/0003227 A1* | 1/2014 | Scudder et al. | H04L 45/021 370/218 |

OTHER PUBLICATIONS

Cisco Express Forwarding Overview, Cisco IOS Switching Services Configuration Guide, no later than Sep. 12, 2012, 7 pages.

H3C S9500 Command Manual-Release 1648[v1.24]-02 IP Services Volume, retrieved Sep. 13, 2012, 11 pages.

Cisco IOS Firewall Configuring IP Access Lists, Dec. 27, 2007, 13 pages.

1-Port Gigabit Ethernet Line Card Configuration, Chapter 11, Cicsco 10000 Series Router Line Card Configuration Guide OL-8834-04, no later than Oct. 2012, 6 pages.

Preparing for Line Card Installation and Configuration, Cisco, retrieved Sep. 17, 2012, 5 pages.

Practical and Near-Optimal FIB Aggregation Using SMALTA, Zartash Afzal Uzmi et al., no later than Sep. 13, 2012, 15 pages.

Caesar: a Content Router for High Speed Forwarding, Matteo Varvello, et al., ICN'12, Aug. 17, 2012, Helsinki, Finland, Aug. 17, 2012 ACM, pp. 73-78.

Incremental Forwarding Table Aggregation, Yaoqing Liu, et al., no later than Sep. 12, 2012, 6 pages.

Terminology for Forwarding Information Base (FIB) based Router Performance, G. Trotter, Agilent Technologies, Dec. 2000, 15 pages.

R. Ramjee, et al., Separating Control Software From Routers, 10 pages, no later than Sep. 24, 2012.

T.V. Lakshman, et al., "The SoftRouter Architecture," 6 pages, no later than Sep. 24, 2012.

* cited by examiner

110

110

PACKET SWITCH MODULES FOR COMPUTER NETWORKS WITH EFFICIENT MANAGEMENT OF DATABASES USED IN FORWARDING OF NETWORK TRAFFIC

BACKGROUND OF THE INVENTION

The present invention relates to information handling systems (IHSs) that include packet switches. A packet switch can be a network router or other device that receives and forwards data in computer networks based on forwarding databases and possibly based on other information stored on the packet switch. Some embodiments of the invention are useful for managing the forwarding databases and such other information.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSS allow for IHSs to be general or configured for a specific user or specific use such as financial transaction processing, airline reservations, enterprise data storage, or global communications. IHSs may include a variety of hardware and software components that may be configured to process, store, and communicate information and may include one or more computer systems, data storage systems, and networking systems, such as a packet switch.

FIG. 1 illustrates an exemplary IP network 104 with routers 110 (i.e. 110.0 through 110.4) and end stations 114, all interconnected by links 120. FIG. 2 is a block diagram of an exemplary router 110. The router includes line cards LCx (LC1 through LCn). Only line card LC1 is shown in detail. The line cards can be identical. Each line card LCx includes a number of ports Px (eight ports in FIG. 1, which are shown as P0 through P7 in line card LC1, and P8 through P15 in line card LC2). Links 120 are connected to these ports. Different line cards may contain different types of ports, e.g. optical, electrical, and others, and different line cards may handle different protocols in the same router. If a packet received on one line card LCx must be transmitted on a port of another fine card, the packet is transferred to the other line card by switch fabric 220.

Line cards LCx and switch fabric 220 form the data plane of router 110. The control plane is provided by route processing managers RPM0, RPM1. Each RPM is connected to all the line cards and the switch fabric. Each RPM may have one or more computer processors 224 executing computer instructions 226 stored in memory 228. The RPMs perform managing functions for the switch. For example, the RPMs perform network discovery and provide forwarding databases to the line cards, respond to management requests received over the network or from the switch's own user interface devices (not shown), and perform other management functions. The computer instructions 226 include suitable applications, e.g. IPC 232 (Inter Process Communication) for message exchange between the two RPMs, or between an RPM and a line card LCx or switch fabric 220; and a routing application 234 (e.g. OSPF). Other applications may also be present.

Each incoming packet is processed based on the packet fields. FIG. 3 shows some fields of an exemplary layer-2 packet 310. The packet includes a layer-2 header 314H and layer-2 payload 314P. Assuming for example that the packet arrived at router 110.0 from an end station 114.1, the packet's layer-2 source address 314S may specify the layer-2 address of station 114.1. If the packet destination is station 114.3 for example, then the layer-2 destination address will be the layer-2 address of station 114.3. If the packet destination is another router 110 or a station 114 connected to another router (e.g. station 114.5), the layer-2 destination address will be the layer-2 address of a port Px of router 110.0.

The remaining fields shown are part of the layer-2 payload 314P, which is an IP packet in this example. The IP packet 314P includes IP header 320H which includes a protocol number field 320L indicating the layer-4 protocol, e.g. UDP, TCP, ICMP, etc. The IP header 320H also includes source and destination IP addresses 320S and 320D. If the packet was originated by station 114.1 as in the example above, the source IP address 320S will be the IP address of station 114.1. The IP destination address 320D is the IP address of the packet's final destination, e.g. station 114.3 or 114.5 or a router 110 in the examples above.

In addition to the IP header, IP packet 314P includes IP payload 320P formed according to the protocol number 320L. In this example, the IP payload is a TCP or UDP packet, which includes a header 330H with source and destination ports 330S and 330D. The IP payload also includes layer-4 payload 330P.

Each line card LCx uses its packet processor 236 and memory 240 to determine the port or ports Px on which the packet must be forwarded. Packet processor 236 can be a computer processor which executes instructions stored in memory 240. In addition to the instructions, the memory 240 stores the incoming packets (not shown), and also stores databases 250 used in packet processing. The databases are also stored in each RPM. The RPM versions are shown as 250R0 for RPM0 and 250R1 for RPM1. The line card versions are shown as 250LC. The line card versions can differ from each other and from one or both of the RPM versions due to possible delays in updating each version.

The memory may include different kinds of memory, e.g. CAM (context addressable memory) for some databases, and may include other kinds of memory for packet queues and computer instructions.

Exemplary databases 250 include a layer-2 forwarding table 250.1 ("MAC Table") shown respectively as 250.1LC, 250R.1R0, and 250.1R1 for the line cards and the RPMs. The same suffixes—LC, R0, R1—will be used for the other databases. The databases 250 include also a layer-3 forwarding table 250.2 (routing table, or RIB (Routing Information Base), or its derivative FIB (Forwarding Information Base)), and an ACL 250.3 (Access Control List).

The following table 1 illustrates an exemplary layer-2 forwarding database 250.1 (sometimes called "MAC table" for Media Access Control):

TABLE 1

Layer-2 (MAC) lookup table 250.1:

| Layer-2 destination address | Egress Ports | Other Info |
|---|---|---|
| 1267210349824689 | P15, P64 | |
| 3458981578642903 | P17 | |

The first column contains layer-2 addresses (MAC addresses), and the second column shows egress ports Px for each layer-2 address. If layer-2 destination address 314D of the incoming packet is found in the first column, the packet is forwarded on the port or ports shown in the second column. The second column may alternatively indicate that the packet is to be forwarded based on its layer-3 destination address 320D.

The third column may contain additional information.

The following Table 2 illustrates an exemplary layer-3 forwarding database 250.2 (RIB or FIB):

TABLE 2

Routing or Forwarding Information Base 250.2:

| Destination IP Address prefix | Egress Ports | Other Info |
|---|---|---|
| 128.16.0.0/15 | P1, P2, P25 . . . | |
| 128.18.0.0/15 | P1, P2, . . . | |
| 128.15.1.2/31 | P17 | |

For each entry, the first column includes an IP address and a mask; the mask is the significant number of the most significant bits in the IP address (e.g. 15 bits in the first two entries in the example above, 31 bits in the last entry). This table is searched for the entry with the longest matching prefix, i.e. with the prefix which has the largest number of most significant bits matching the incoming packet's IP destination address 320D. The packet is then forwarded on one or more of the egress ports specified in the second column.

In ACL database 250.3, each entry specifies IP source and/or destination addresses 320S, 320D, and whether a packet with such addresses is permitted or denied forwarding.

Database management involves making changes to databases 250 in response to management messages (possibly in the form of management packets 310 received over the network, or management messages entered from a user interface device (not shown) on router 110). The database changes may result from learning algorithms. For example, each line card LCx learns the association between its ports Px and layer-2 addresses from the incoming traffic: if the line card receives a packet on a port Px, the line card associates the packet's layer-2 source address 314D with the port Px, and enters this association into the line card's MAC Table 250.1LC. The fine card also informs an RPM, and the RPMs inform the other line cards. Also, the RPMs run routing algorithms (e.g. OSPF (Open Shortest Path First), OSPF Incremental SPF, and/or BGP (Border Gateway Protocol), or others) to learn network topology and construct routing tables such as 250.2R0, 250.2R1. This information is then distributed to the line cards. Each line card's database 250.2LC can be identical to the routing tables 250.2R0, 250.2R1, or can be derived from the routing tables (to delete redundant routing paths for example).

In a redundant architecture, one RPM is primary, and the other RPM is secondary. The switch is managed by the primary RPM until the primary RPM fails. The primary RPM's failure may be detected by a line card or the secondary RPM for example. The switch management is then transferred to the secondary RPM in a failover operation. When the switch is managed by the primary RPM, the primary RPM provides copies of its databases 250, and of all the changes to the databases, to the secondary RPM, to avoid the need for database copying during failover. See e.g. U.S. Pat. No. 7,974,315 issued Jul. 5, 2011 to Yan et al., incorporated herein by reference.

Databases 250 may be large, and it is desirable to reduce the amount of communication between the RPMs and between an RPM and the line cards in database management.

SUMMARY

This section summarizes some features of the invention. Other features may be described in the subsequent sections. The invention is defined by the appended claims, which are incorporated into this section by reference.

In failover, when the primary RPM fails, the secondary RPM may have to push its databases 250 to the line cards, via IPC for example. The databases may be large, and pushing the databases to the line cards requires significant resources on the switch. The switch may freeze due to insufficient resources. This problem can be exacerbated if the IPC resources are overused by any applications running on the switch (e.g. on the RPMs). The IPC resources can be overused if an application does not react to backpressure messages when sending information to switch modules. For example, if the OSPF application sends messages to line cards, and the line cards are busy and unable to process the messages but the application ignores the busy signals from the line cards and continues to resend the same messages until getting an acknowledgement of successful receipt from the line cards, the IPC channels used by the application are overused, and the switch may freeze.

Some embodiments of the invention reduce the IPC communication in failover without changing the applications. Some embodiments provide database organization schemes and communication protocols that reduce the amount of database-related traffic both in failover and at other times during the switch operation. For example, a database can be organized to include a baseline piece and incremental pieces. The incremental pieces may include database updates. Each piece is identified by an identifier, called "version identifier" below. During failover, the secondary RPM queries each line card for the version identifiers of the pieces stored on the line card. Then the secondary RPM requests the line card to modify the line card's pieces if needed. The RPM sends only those database pieces that are needed to update the line card's database. In these communications, the database pieces are identified by their version identifiers, so the pieces already present on the line card need not be retransmitted.

The RPM may instruct a line card to aggregate the incremental and baseline pieces into a new baseline piece. The RPM may request the line cards to identify their database pieces by version identifiers. These protocols facilitate database management.

The invention is not limited to use of IPC, to line cards or other features of FIG. 2, or features and advantages described above, except as defined by the appended claims.

DESCRIPTION OF SOME EMBODIMENTS

The embodiments described in this section illustrate but do not limit the invention. The invention is defined by the appended claims.

Figure 1:
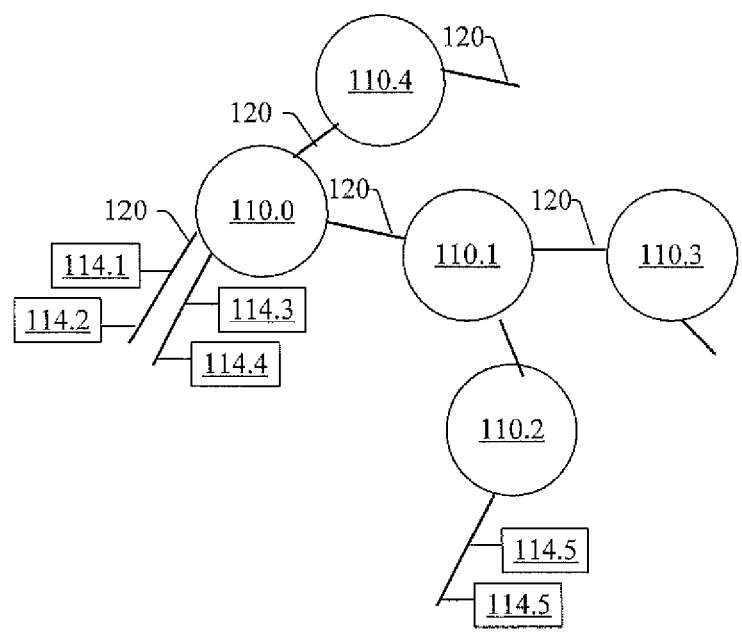
FIG. 1 is a block diagram of a network with packet switches according to prior art.
Figure 2:
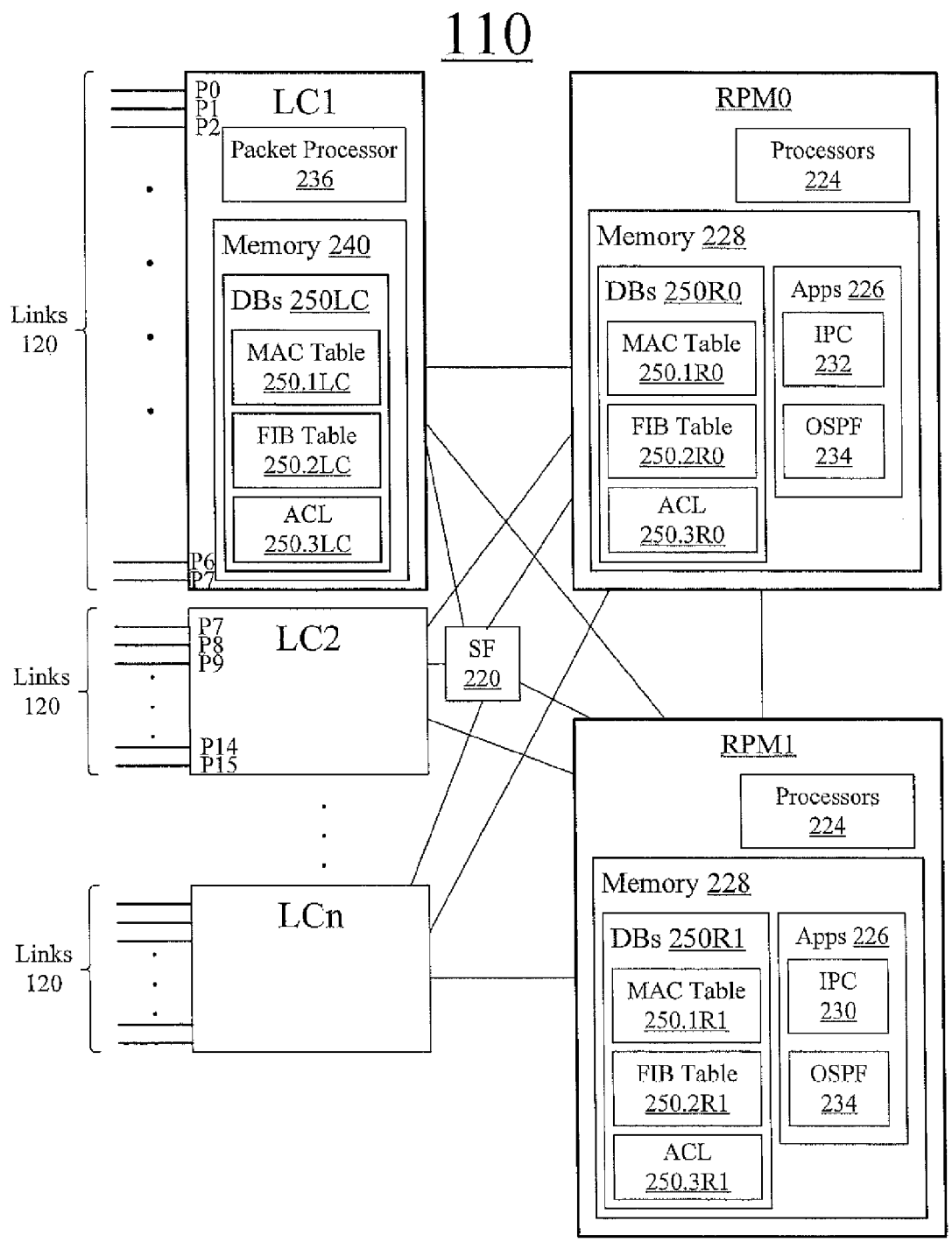
FIG. 2 is a block diagram of a packet switch according to prior art.
Figure 3:
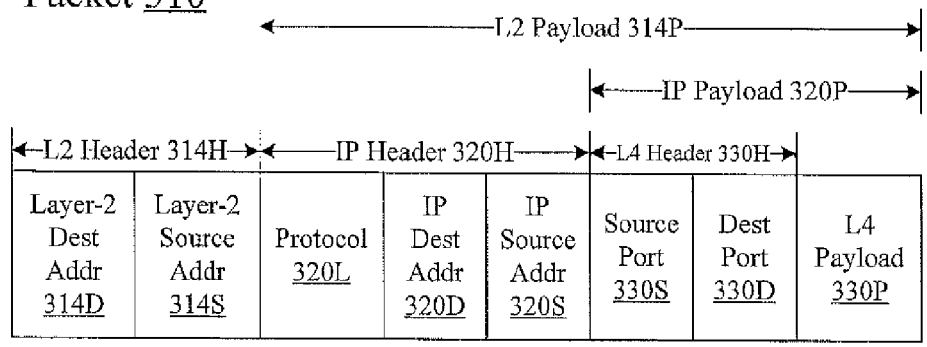
FIG. 3 is a block diagram of an IP packet according to prior art.
Figure 4:
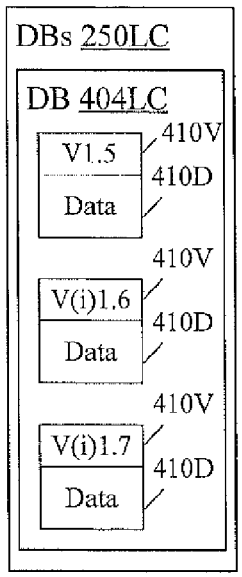
FIG. 4 is a block diagram of memories and data structures in different modules of a packet switch according to some embodiments of the present invention.
Figure 4:
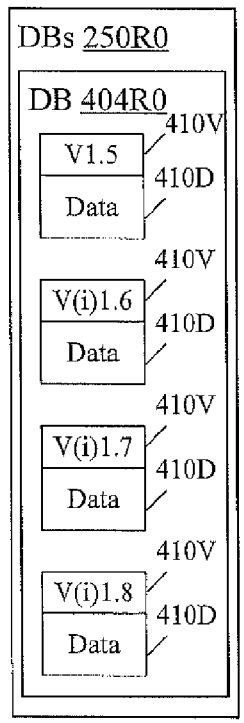
Figure 4:
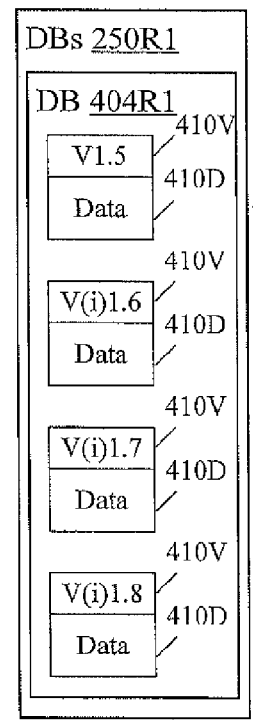

FIG. 4 illustrates data stored in a line card's memory 240 and RPM0's and RPM1's memories 228 in a modification of the packet switch 110 of FIG. 2 according to some embodiments of the present invention. In some embodiments, the modified switch is identical to the switch of FIG. 2 except as noted below. The invention is not limited to such embodiments however.

Each of memories 240 and 228 of FIG. 4 stores respective databases 250 (250LC, 250R0, 250R1). A single database 404 (i.e. 404LC in the line card, 404R0 in RPM0, and 404R1 in RPM1) is shown in each of the three modules LCx, RPM0, RPM1. Database 404 can be any one of databases 250.1 (Mac tables), 250.2 (FIB or RIB (Routing information Base), 250.3 (ACL) as described above, or can be some other database. In each module, database 404 includes several pieces. Each piece includes a data portion 410D and a version identifier 410V. In the example of FIG. 4, the versions include a baseline version V1.5 and incremental versions V(i)1.6, V(i)1.7, V(i)1.8. The term "version" is sometimes used herein as synonymous with the version identifier 410V of a database piece, and sometimes as synonymous with the entire piece 410V, 410D. A version identifier can be any identifier. In the example being described, all the version identifiers start with "V1", followed by "(i)" if the piece is incremental, followed by a period, followed by a consecutive version number (e.g. 5, 6, 7, or 8). For a baseline version V1.x, the corresponding incremental versions are numbered consecutively as V(i)1.x+1, V(i)1.x+2, V(i)1.x+3, etc. In each module, the entire database 404 consists of the baseline version V1.x and, possibly, the corresponding incremental versions. The baseline version and the corresponding incremental versions can be aggregated into a new baseline version as described below.

The invention is not limited to particular version identifiers. The version identifiers can be randomly generated or generated according to any other convention.

In FIG. 4, the line card includes the versions V1.5, V(i)1.6, V(i)1.7. Each RPM includes the same versions plus the version VI(i).8. The line card has not yet been updated with version V1(1).8. The other line cards are not shown, and they may or may not have the same versions as the line card of FIG. 4.

Figure 5:
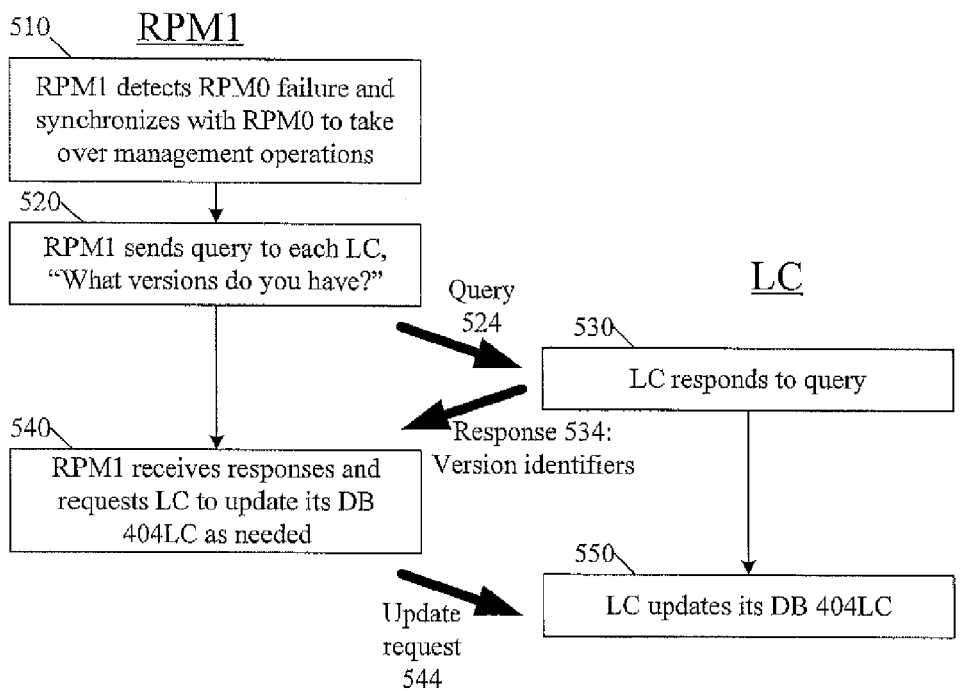
FIG. 5 is a flow chart of failover operations performed by a packet switch according to some embodiments of the present invention.

FIG. 5 illustrates an exemplary flow chart of a failover operation in some embodiments of the present invention. At step 510, RPM1 detects RPM0 failure and synchronizes with RPM0 to take over the switch management. Failure detection may occur in many ways. For example, a line card may send a message to RPM0, e.g. to inform RPM0 of a new MAC address learned by the LC for a port Px, and the line card detects the RPM0 failure if RPM0 does not respond to the message in a manner required by the protocol in force (e.g. an IPC protocol). The line card then informs RPM1 of the RPM0 failure. Alternatively, the failure may be detected if RPM0 does not respond to an RPM1 message. Other failure detection scenarios are possible.

At step 520, RPM1 sends a query 524 to each LC, "What versions do you have for database 404LC?"

At step 530, each LC receives the query and responds with the list of its version identifiers 534. For example, the LC of FIG. 4 responds with the list "V1.5, V(i)1.6, V(i)1.7". No data 410D are transferred up to this point.

At step 540, RPM1 receives the version identifiers 534. For each LC, if the LC's database 404LC needs to be updated, RPM1 sends an update request 544.

For example, referring to FIG. 4, the update request 544 may be:

"Here is new incremental version V(i)1.8".

Another possibility for step 540 is: RPM1 aggregates its versions V1.5, V(i)1.6, V(i)1.7, V(i)1.8 into a new baseline version V1.6, and sends the following update request 544:

"Here is new incremental version V(i)1.8; please aggregate V1.5, V(i)1.6, V(i)1.7, V(i)1.8 into a new baseline version V1.6".

Advantageously, RPM1 does not need to send the entire V1.6 baseline piece.

At step 550, the LC updates its database 404LC as requested. Optionally, the LC confirms to RPM1 that the request 544 has been performed.

The same dialog can be performed with each LC. Of note, the failover operation of FIG. 5 does not involve any transfer of data portions 410D except possibly in requests 544. The communication is therefore reduced. For example, if the database updates occur over the IPC, then the IPC bandwidth is freed.

The same or similar dialogs can be used for each database 250.1, 250.2, 250.3, or other databases.

A similar dialog can be used in a non-failover operation, when the primary RPM( )sends database updates to the line cards or RPM1. Step 510 is omitted. Steps 520, 540 are performed by RPM0, and steps 530 and 550 by RPM1. If RPM0 keeps track of the RPM1 versions, then the query steps 520, 530 can be omitted. A similar dialog can be conducted between RPM0 or RPM1 and an LC in a non-failover operation, to update the LC database.

Update requests 544 may have many forms. For example, the requester (RPM1 in FIG. 5) may instruct the receiver (the LC in FIG. 5) to delete a database piece, e.g.:

Here is incremental version V(i)1.8; please delete version V(i)1.6; please aggregate V1.5, V(i)1.7, V(i)1.8 into a new baseline version V1.6.

Request 544 may also request the receiver to modify a specific database piece.

In some embodiments, when the receiver (LCx or RPM1) updates its database, e.g. aggregates a baseline version with incremental versions, the receiver also keeps the previous versions. For example, in FIG. 4, if the LC aggregates the versions V1.5, V(i)1.6, V(i)1.7, V(i)1.8 into a new baseline version V1.6, the LC may or may not keep the versions V1.5, V(i)1.6, V(i)1.7, V(i)1.8 in its archive in memory 240. The archive can be used in a roll-back operation, i.e. if a subsequent request 544 requests the LC to revert to the versions V1.5, V(i)1.6, V(i)1.7, V(i)1.8. The archive can also help in debugging, in fine-tuning of switch 110, or maybe for other purposes. The data structures (e.g. trees or linked lists) commonly used for databases 250 can be readily adjusted to hold the archives.

In some embodiments, in non-failover operations, database updates occur regularly at predefined intervals of time ("epochs"): the RPM in charge of database updates (RPM0 or RPM1) accumulates incremental updates during each epoch, and distributes the incremental updates to the LCs and possibly the other RPM at the end of the epoch. The database updates can be distributed as at steps 520-550 of FIG. 5 as described above, possibly skipping the steps 520 and 530.

Figure 6:
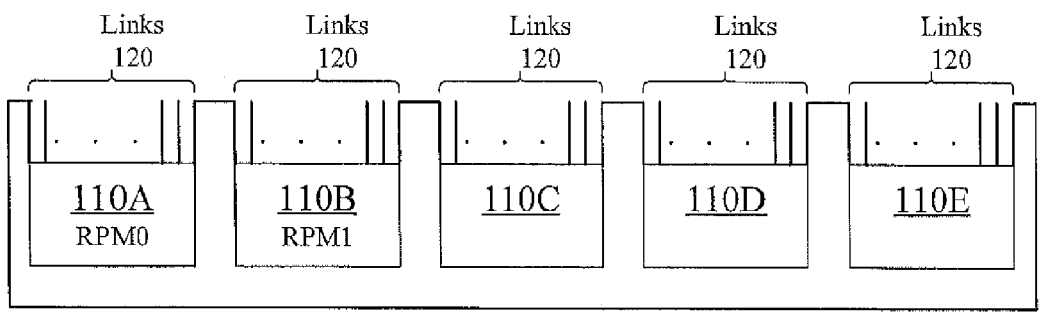
FIG. 6 is a block diagram of a stacked packet switch according to some embodiments of the present invention.

The invention is not limited to the switch architecture of FIG. 2. The switch may have any number of line cards or possibly no line cards, and any number of the RPMs. The switch may have a multiple chassis architecture; see e.g. U.S.

pre-grant patent publication 2012/0039335 A1 (Feb. 16, 2012) of U.S. patent application Ser. No. 12/856,342 filed Aug. 13, 2010 by Subramanian et al.; this publication is incorporated herein by reference. Some embodiments provide the functionality of a single line card on multiple cards or printed circuit boards. The invention covers stacked switches such as shown in FIG. 6: a switch 110 is formed of multiple switches—five switches 110A, 110B, 110C, 110D, 110E in this example. Each of the five switches may have the architecture of FIG. 2, or any other architecture, e.g. with a functionality of only one line card. The switches are connected in series: one port Px of each switch is connected by a link 120 to a port Px of the next switch. Possibly (but not necessarily), the last switch 110E is connected to the first switch 110A to improve reliability. Each switch performs the function of one or more line cards, i.e. packet forwarding; in addition, one of the switches, e.g. 110A, performs the function of the primary RPM (RPM0); switch 110B performs the function of the secondary RPM. There may be multiple secondary RPMs. Soft router switches are used in some embodiments; see U.S. pre-grant patent publication 2006/0092975 A1 (May 4, 2006) of U.S. patent application Ser. No. 11/147,665 filed Jun. 8, 2005 by Ansari et al.; this publication is incorporated herein by reference.

Some embodiments of the present invention provide a method for operating a packet switch comprising a plurality of modules which comprise a first module and a second module. For example, the first module could be RPM0 or RPM1, and the second module could be a line card. Or the first module could be RPM0 and the second module could be RPM1. The modules could be on the same or different boards, and could be in the same or different switches 110A-110E of the stacking switch of FIG. 6, and could be part of a soft-router switch, and could be part of the same integrated circuit or different integrated circuits. Other embodiments are also possible. The packet switch forwards packets in a network according to one or more databases stored on the packet switch, the one or more databases comprising a first database stored on the second module. For example, the first database could be 404LC or 404R1. The first database comprises one or more first pieces stored on the second module, each first piece being identified by an identifier (such as a version identifier described above or some other type of identifier).

The method comprises performing operations by the first module, the operations comprising:

communicating with the second module to request the second module to perform at least one of:
 inform the first module of information stored in the one or more first pieces stored on the second module (for example, by query 524), and/or
 change at least one first piece stored on the second module (e.g. by update request 544).

In said communicating, at least one first piece is specified by the first piece's identifier.

In some embodiments, the packet switch further comprises a third module performing one or more functions in processing of packets received by the packet switch; wherein the one or more functions are also operable to be performed by the first module. For example, the third module could be the primary RPM, and the first module could be the secondary RPM, and the second module could be a line card. These and other examples herein are not limiting.

The method comprises detecting the third module's failure by the packet switch, wherein the packet switch uses said communicating of the first module with the second module to arrange for the one or more functions to be performed by the first module instead of the third module. For example, the "communicating" could be the communicating of the first module as the secondary RPM with the second module as the line card.

In some embodiments, the first module performs one or more functions which are also operable to be performed by the second module instead of the first module if the first module fails. For example, the first module could be the primary RPM, and the second module the secondary RPM. The first module stores a second database (e.g. 404R0) comprising at least some of information stored in the first database (e.g. 404R1).

Said communicating of the first module with the second module is performed to provide the second module with the information from the second database to arrange for the second module to perform the one or more functions instead of the first module in case the first module fails.

Some embodiments provide a computer readable medium (e.g. semiconductor memory, magnetic memory (e.g. magnetic disk), optical memory (e.g. CD-ROM), or some other type of medium) comprising computer program code operable to cause a packet switch's first module, second module, or third module to perform any of the methods discussed above. The methods are performed when a computer processor or processors of the first, second, or third module execute the computer program code. The computer program code includes one or more computer instructions for execution by such processor or processors. The instructions can be downloaded into the respective module over a computer network, e.g. over the links 120. The computer readable medium can include any one or more of memories 228, 240 or can be some other medium.

The invention is not limited to the embodiments described above. Other embodiments and variations are within the scope of the invention, as defined by the appended claims.

The invention claimed is:

1. A method for operating a packet switch comprising a plurality of modules which comprise a first module and a second module, wherein the packet switch forwards packets in a network according to one or more databases stored on the packet switch, the one or more databases comprising a first database stored on the second module, the first database comprising a set of one or more first pieces stored on the second module, each first piece being identified by an identifier which is a version identifier;
the method comprising performing operations by the first module, the operations comprising:
communicating with the second module to request the second module to perform at least one of:
(a) inform the first module of information stored in the one or more first pieces stored on the second module,
(b) change the set of one or more first pieces stored on the second module;
wherein in said communicating, at least one first piece is specified by the first piece's identifier;
wherein said communicating with the second module comprises:
(1) requesting the second module to perform (a);
(2) receiving from the second module a set of one or more identifiers of one or more first pieces stored on the second module;
(3) determining from the set of one or more identifiers whether or not the first database is to be updated;
(4) if the first database is to be updated, then requesting the second module to perform (b) to update the first database;
wherein the set of one or more pieces comprises a baseline piece and one or more incremental pieces, and requesting the second module to perform (b) comprises requesting the second module to aggregate the baseline piece and each said incremental piece into a new baseline piece.

2. The method of claim 1 wherein the packet switch further comprises a third module performing one or more functions in processing of packets received by the packet switch;
 wherein the one or more functions are also operable to be performed by the first module;
 wherein the method comprises detecting the third module's failure by the packet switch, wherein the packet switch uses said communicating of the first module with the second module to arrange for the one or more functions to be performed by the first module instead of the third module.

3. The method of claim 1 wherein the first module performs one or more functions which are also operable to be performed by the second module instead of the first module if the first module fails;
 the first module stores a second database comprising at least some of information stored in the first database; and
 said communicating of the first module with the second module is performed to provide the second module with the information from the second database to arrange for the second module to perform the one or more functions instead of the first module in case the first module fails.

4. The method of claim 1 wherein operations (1) through (3) do not involve any transfer of any packet-forwarding data between the first and second modules, the packet-forwarding data being data carrying information on how to forward packets.

5. The method of claim 1 wherein, operation (4) does not involve any transfer of any packet-forwarding data between the first and second modules.

6. The method of claim 1 wherein each first piece comprises:
 one or more pieces of matching information; and
 for each piece of matching information, corresponding processing information on how to process packets that match the matching information.

7. The method of claim 6 wherein at least one piece of matching information comprises at least part of a destination address.

8. The method of claim 6 wherein for at least one piece of matching information, the corresponding processing information specifies one or more egress ports on which to forward packets that match the matching information.

9. A first module for a packet switch, the first module being operable to perform a method for operating the packet switch comprising a plurality of modules which comprise the first module and a second module, wherein in the method the packet switch is operable to forward packets in a network according to one or more databases stored on the packet switch, the one or more databases comprising a first database stored on the second module, the first database comprising a set of one or more first pieces stored on the second module, each first piece being identified by an identifier which is a version identifier;
 the method comprising performing operations by the first module, the operations comprising:
 communicating with the second module to request the second module to perform at least one of:
 (a) inform the first module of information stored in the one or more first pieces stored on the second module;
 (b) change the set of one or more first pieces stored on the second module;
 wherein in said communicating, at least one first piece is specified by the first piece's identifier;
 wherein said communicating with the second module comprises:
 (1) requesting the second module to perform (a);
 (2) receiving from the second module a set of one or more identifiers of one or more first pieces stored on the second module;
 (3) determining from the set of one or more identifiers whether or not the first database is to be updated;
 (4) if the first database is to be updated, then requesting the second module to perform (b) to update the first database;
 wherein the set of one or more pieces comprises a baseline piece and one or more incremental pieces, and requesting the second module to perform (b) comprises requesting the second module to aggregate the baseline piece and each said incremental piece into a new baseline piece.

10. The first module of claim 9, wherein the first module is operable to be used in the packet switch which further comprises a third module for performing one or more functions in processing of packets received by the packet switch;
 wherein the one or more functions are also operable to be performed by the first module;
 wherein the first module is operable, in response to an indication of the third module's failure, to use said communicating of the first module with the second module to arrange for the one or more functions to be performed by the first module instead of the third module.

11. The first module of claim 9 wherein the first module is operable to perform one or more functions which are also operable to be performed by the second module instead of the first module if the first module fails;
 wherein the first module is operable to store a second database comprising at least some of information stored in the first database; and
 said communicating of the first module with the second module is to be performed to provide the second module with the information from the second database to arrange for the second module to perform the one or more functions instead of the first module in case the first module fails.

12. A packet switch comprising the first module of claim 9 in combination with the second module.

13. A packet switch comprising the first module of claim 10 in combination with the second and third modules.

14. The first module of claim 9 wherein in said method, operations (1) through (3) do not involve any transfer of any packet-forwarding data between the first and second modules, the packet-forwarding data being data carrying information on how to forward packets.

15. The first module of claim 9 wherein in said method operation (4) does not involve any transfer of any packet-forwarding data between the first and second modules.

16. The first module of claim 9 wherein each first piece comprises:
 one or more pieces of matching information; and
 for each piece of matching information, corresponding processing information on how to process packets that match the matching information.

17. The first module of claim 9 wherein at least one piece of matching information comprises at least part of a destination address.

18. A non-transitory computer readable medium comprising computer program code operable to cause a packet switch's first module to perform a method for operating the packet switch comprising a plurality of modules which comprise the first module and a second module, wherein in the method the packet switch is operable to forward packets in a network according to one or more databases stored on the packet switch, the one or more databases comprising a first database stored on the second module, the first database comprising a set of one or more first pieces stored on the second module, each first piece being identified by an identifier which is a version identifier;

the method comprising performing operations by the first module, the operations comprising:
communicating with the second module to request the second module to perform at least one of:
(a) inform the first module of information stored in the one or more first pieces stored on the second module,
(b) change the set of one or more first pieces stored on the second module; wherein in said communicating, at least one first piece is specified by the first piece's identifier;
wherein said communicating with the second module comprises:
(1) requesting the second module to perform (a);
(2) receiving from the second module a set of one or more identifiers of one or more first pieces stored on the second module;
(3) determining from the set of one or more identifiers whether or not the first database is to be updated;
(4) if the first database is to be updated, then requesting the second module to perform (b) to update the first database;
wherein the set of one or more pieces comprises a baseline piece and one or more incremental pieces, and requesting the second module to perform (b) comprises requesting the second module to aggregate the baseline piece and each said incremental piece into a new baseline piece.

19. The non-transitory computer readable medium of claim 18 wherein the packet switch further comprises a third module for performing one or more functions in processing of packets received by the packet switch;
wherein the one or more functions are also operable to be performed by the first module;
wherein the method comprises detecting the third module's failure by the packet switch, wherein in the method the packet switch is operable to use said communicating of the first module with the second module to arrange for the one or more functions to be performed by the first module instead of the third module.

20. The non-transitory computer readable medium of claim 18 wherein in the method the first module is operable to perform one or more functions which are also operable to be performed by the second module instead of the first module if the first module fails;
the first module is operable to store a second database comprising at least some of information stored in the first database; and
said communicating of the first module with the second module is to be performed to provide the second module with the information from the second database to arrange for the second module to perform the one or more functions instead of the first module in case the first module fails.

* * * * *